United States Patent
Peri

(10) Patent No.: US 10,304,207 B2
(45) Date of Patent: May 28, 2019

(54) SYSTEM AND METHOD FOR OPTICAL TRACKING

(71) Applicant: Samsung Electronics Co., Ltd., Suwon-si (KR)

(72) Inventor: Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/805,750

(22) Filed: Nov. 7, 2017

(65) Prior Publication Data

US 2019/0012803 A1 Jan. 10, 2019

Related U.S. Application Data

(60) Provisional application No. 62/529,833, filed on Jul. 7, 2017.

(51) Int. Cl.
| | |
|---|---|
| *G06T 7/00* | (2017.01) |
| *G06T 7/73* | (2017.01) |
| *G06K 9/00* | (2006.01) |
| *G06T 7/246* | (2017.01) |
| *G06T 7/11* | (2017.01) |

(52) U.S. Cl.
CPC ............ *G06T 7/73* (2017.01); *G06K 9/00624* (2013.01); *G06T 7/11* (2017.01); *G06T 7/246* (2017.01); *G06T 2207/30244* (2013.01)

(58) Field of Classification Search
None
See application file for complete search history.

(56) References Cited

U.S. PATENT DOCUMENTS

| | | | |
|---|---|---|---|
| 6,728,404 B1 | 4/2004 | Ono et al. | |
| 7,840,031 B2 | 11/2010 | Albertson et al. | |
| 8,055,020 B2 | 11/2011 | Meuter et al. | |
| 9,042,600 B2 | 5/2015 | Endo | |
| 9,383,445 B2 | 7/2016 | Lu et al. | |

(Continued)

FOREIGN PATENT DOCUMENTS

| | | |
|---|---|---|
| EP | 2960886 A1 | 12/2015 |
| JP | 2009-089365 A | 4/2009 |

(Continued)

OTHER PUBLICATIONS

ISA/KR, "International Search Report and Written Opinion of the International Searching Authority," International Application No. PCT/KR2018/000892, dated Apr. 23, 2018, 9 pages.

*Primary Examiner* — Delomia L Gilliard

(57) ABSTRACT

A method, electronic device, and non-transitory computer readable medium for optical tracking are provided. The method includes identifying at least one object within an environment, from received image data. The method also includes assigning a volatility rating to the identified object. Additionally, the method includes determining one or more tracking points associated with the identified object. The method also includes determining a priority rating for the each of the one or more tracking points associated with the identified object based on the assigned volatility rating of the identified object. The method also includes selecting the one or more tracking points for optical tracking based on the priority rating.

23 Claims, 10 Drawing Sheets

(56) References Cited

U.S. PATENT DOCUMENTS

| | | |
|---|---|---|
| 2005/0046597 A1 | 3/2005 | Hutchison et al. |
| 2009/0087029 A1 | 4/2009 | Coleman et al. |
| 2014/0119608 A1 | 5/2014 | Lee et al. |
| 2014/0226858 A1 | 8/2014 | Kang et al. |
| 2014/0267403 A1 | 9/2014 | Maciocci et al. |
| 2015/0332102 A1* | 11/2015 | Lu .................... G01S 7/4802 348/222.1 |
| 2016/0086383 A1 | 3/2016 | Starner et al. |
| 2016/0195952 A1 | 7/2016 | Yamamoto et al. |
| 2016/0196268 A1* | 7/2016 | Borger ............ G06F 17/30017 707/748 |
| 2016/0255282 A1 | 9/2016 | Bostick et al. |
| 2016/0299663 A1 | 10/2016 | Kim et al. |
| 2016/0355181 A1 | 12/2016 | Morales Teraoka et al. |
| 2016/0364124 A1 | 12/2016 | Heater |
| 2018/0124456 A1* | 5/2018 | Terrazas ............... H04N 21/442 |
| 2018/0338120 A1* | 11/2018 | Lemberger ............ H04N 7/186 |

FOREIGN PATENT DOCUMENTS

| | | |
|---|---|---|
| JP | 2012-064153 A | 3/2012 |
| JP | 2016018374 A | 2/2016 |
| JP | 2017-027602 A | 2/2017 |
| KR | 10-2011-0133476 A | 12/2011 |

\* cited by examiner

SYSTEM AND METHOD FOR OPTICAL TRACKING

CROSS-REFERENCE TO RELATED APPLICATION AND CLAIM OF PRIORITY

This application claims priority under 35 U.S.C. § 119(e) to U.S. Provisional Patent Application No. 62/529,833, filed on Jul. 7, 2017 and entitled "SYSTEM AND METHOD FOR OPTICAL TRACKING". The above-identified provisional patent application is hereby incorporated by reference in its entirety.

TECHNICAL FIELD

This disclosure relates generally to image processing. More specifically, this disclosure relates to optical tracking and prioritizing tracking points based on object recognition.

BACKGROUND

Computer vision is an enormous step in computer intelligence as it provides a myriad of new capabilities. For example, through optical tracking a computer can determine its current location in an environment relative to other objects. Computing systems can process the input from one or more cameras and build a model of an environment. As the camera(s) move throughout the environment, the computing system can know where it is, and where it has been. Optical tracking allows computing systems to build a map of unknown surroundings while determining its location within the surroundings.

SUMMARY

This disclosure provides embodiments of a system and method for optical tracking.

In a first embodiment, a method for optical tracking is provided. The method includes identifying at least one object within an environment, from received image data. The method also assigns a volatility rating to the identified object. The method also determines one or more tracking points associated with the identified object and determines a priority rating for the each of the one or more tracking points associated with the identified object based on the assigned volatility rating of the identified object. The method further includes selecting the one or more tracking points for optical tracking based on the priority rating.

In a second embodiment, an electronic device is provided. The electronic device includes at least one processor. The at least one processor is coupled to a communication interface and configured to identify at least one object within an environment, from received image data. The least one processor is also configured to assign a volatility rating to the identified object. The least one processor is also configured to determine one or more tracking points associated with the identified object. The least one processor is also configured to determine a priority rating for the each of the one or more tracking points associated with the identified object based on the assigned volatility rating of the identified object. The least one processor is also configured to select the one or more tracking points for optical tracking based on the priority rating.

In a third embodiment a non-transitory computer readable medium embodying a computer program is provided. The computer program includes program code that when executed causes at least one processor to identify at least one object within an environment, from received image data; assign a volatility rating to the identified object; determine one or more tracking points associated with the identified object; determine a priority rating for the each of the one or more tracking points associated with the identified object based on the assigned volatility rating of the identified object; and select the one or more tracking points for optical tracking based on the priority rating.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
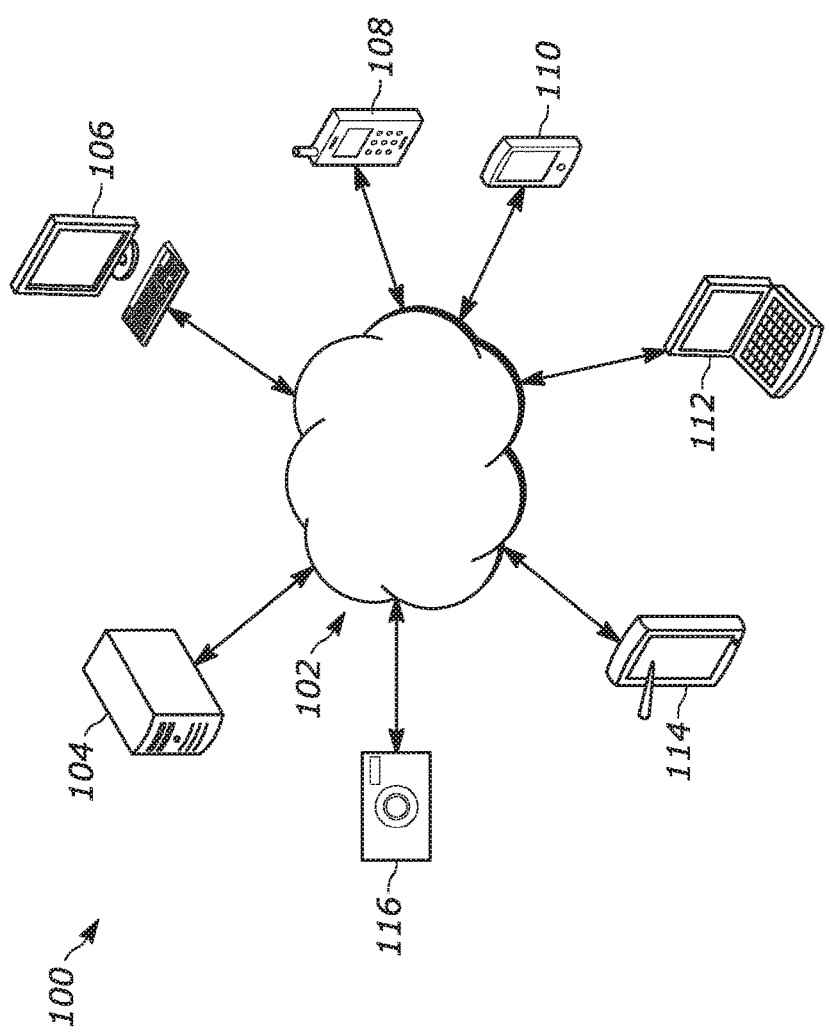
FIG. 1 illustrates an example communication system in accordance with embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged optical tracking system or device.

According to embodiments of the present disclosure, optical tracking is the process of locating objects over time using a camera. Optical tracking can (i) track objects moving throughout the environment while the camera remains stationary, (ii) track objects in the environment as the camera moves through the environment, (iii) combination of both, and the like. For example, optical tracking processes can track one or more objects as they move throughout the environment, while the camera remains stationary (or nearly stationary). Such process is useful for computing systems to learn and predict future movement patterns of the object. Additionally, such processes are useful for selecting a specific object for a camera to focus on. Optical tracking processes can track one or more objects as the camera itself moves throughout an environment. Such process is useful for computing systems to learn an environment that was previously unknown. Those skilled in the art will appreciate a plethora of scenarios when optical tracking may be useful.

Optical tracking may utilize various techniques such as Simultaneous Localization and Mapping (SLAM). Generally, SLAM allows a computing system to build a map of unknown surroundings while determining its location within the surroundings. SLAM solutions are capable of processing an input from a single camera coupled to an electronic device to continuously build a model of an environment as the camera moves. SLAM systems may simultaneously track the position and orientation (pose) of the device with respect to the learned environment. In various embodiments, SLAM systems track the electronic device and/or build a map of the environment based on the movement of the electronic device.

SLAM systems can include Visual SLAM (VSLAM), Airborne Cooperative Visual Simultaneous Localization and Mapping (C-VSLAM), Unconstrained SLAM (USLAM), and the like. Other SLAM systems can combine six degrees of freedom (6DOF) such as general camera motion. Additionally, the tracking and mapping aspects of SLAM systems can be performed simultaneously, and/or asynchronously.

The environment built by a SLAM system can include a variety of aspects such as three dimensional (3D) features. The environment built by a SLAM system can utilize object recognition technology through computer vision (CV) and/or artificial intelligence (AI) to determine the identity or classification of objects. Object recognition provides various characteristics of the identified/classified objects, found within the optical tracking environment.

Optical tracking is often used in virtual reality or augmented reality by capturing and understanding where objects move through an environment as well as where the camera is in relation to objects within the environment.

Optical tracking systems may rely on tracking visual objects in the environment. An optical tracking system associates one or more non-tangible tracking points with the object with one or more target objects. For example, as the camera moves it compares the new location or pose respective to each of the tracking points. If an object in the environment with one or more tracking points is removed from the environment the tracking points are lost. If an object in the environment with one or more tracking points is moved from its original location, the optical tracking system may base its location on the moved object new location. Such scenarios may confuse or provide errors while tracking the environment.

Therefore, embodiments of the present disclosure include within the scope of the disclosure that it may be useful to track objects within an environment and know the location of a camera as it moves through an environment. Embodiments of the present disclosure provide numerous advantages by exploit object recognition processes to identify and/or classify the various objects within an environment. But identifying an object, the optical tracking systems can determine the nature of the object such as whether the object is likely to move or remain stationary. Based on the determination of an object's nature (i.e., likelihood of moving), the optical tracking system may prioritize tracking points within the environment to provide improved tracking.

Embodiments of the present disclosure further include within the scope of the disclosure that optical tracking of an environment as used herein is not limited to a personal use (in a residence or of a an outdoor setting), rather such devices may be incorporated and used in a variety of locations, such as in a virtual and augmented reality headsets, gaming systems, as well as a variety of industries such as education, automotive, telecommunications, retail, healthcare, government, commercial video production, and the like.

Embodiments of the present disclosure recognize and take into consideration that the fields of image processing and SLAM are such that many different variations of the illustrated and described features of this disclosure are possible. Those skilled in the art will appreciate that embodiments of the present disclosure can be practiced without some specific details described below, and indeed will see that many other variations and embodiments can be practiced.

FIG. 1 illustrates an example system 100 according to this disclosure. The embodiment of the system 100 shown in FIG. 1 is for illustration only. Other embodiments of the system 100 could be used without departing from the scope of this disclosure.

As shown in FIG. 1, system 100 includes network 102, which facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between various server(s) 104 and various client devices 106-116. Server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-116 represents any suitable computing or processing device that interacts with at least one server or other computing device(s) over the network 102. In this example, the client devices 106-116 include a desktop computer 106, a mobile telephone or mobile devices 108 (i.e., smartphone), a personal digital assistant (PDA) 110, a laptop computer 112, a tablet computer 114, and camera 116. However, any other or additional client devices could be used in the system 100.

In various embodiments of system 100, client devices 106-116 communicate either directly or indirectly with the network 102. For example, one or more client devices 106-116 can communicate with network 102 via one or more base stations (not shown) such as cellular base stations or eNodeBs. Also, one or more client devices 106-116 can communicate with network 102 via one or more wireless access points (not shown) such as IEEE 802.11 wireless access points. Note that these are for illustration only and that each client device could communicate directly with the network 102 or indirectly with the network 102 via any suitable intermediate device(s) or network(s). For example, camera 116 can communicate with server 104 directly or indirectly. For another example, camera 116 can communicate with desktop computer 106 via a wired connection without accessing network 102.

In certain embodiments, camera 116 transmits information securely and efficiently to another device, such as, for example, server 104, or any other client device 106-114. Camera 116 is able to capture and record images taken during regular or irregular intervals. For example, camera 116 is able to record an image at a regular predetermined time interval, such as, one image every 5 milliseconds, one image every 5 hours, ten images taken at random times within a given time period, and so forth. It is noted that the times listed are for exemplary purposes only and other time periods could be used. Camera 116 captures and records images taken during irregular intervals. For example, when tracking the environment, camera 116 can record a picture on an as-needed basis or based on a randomly generated sequence.

Although FIG. 1 illustrates one example of a system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
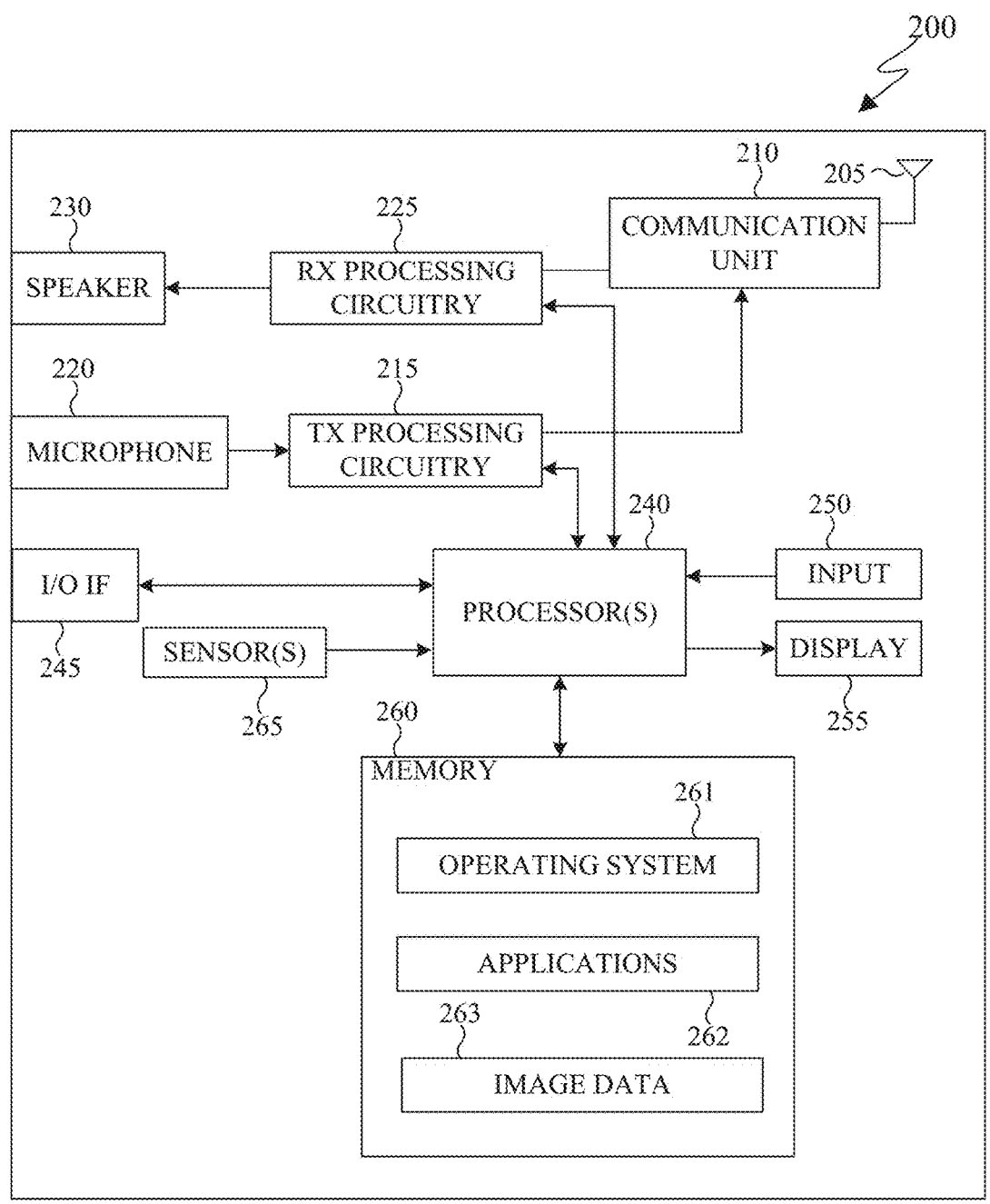
FIG. 2 illustrates an electronic device in accordance with an embodiment of this disclosure.

FIG. 2 illustrates an electronic device in a computing system in accordance with an embodiment of this disclosure. The embodiment of the electronic device 200 shown in FIG. 2 is for illustration only and other embodiments could be used without departing from the scope of this disclosure. The electronic device 200 may come in a wide variety of configurations, and FIG. 2 does not limit the scope of this disclosure to any particular implementation of a electronic device In certain embodiments, one or more of the devices 104-114 of FIG. 1 can include the same configuration as electronic device 200.

In certain embodiments, the electronic device 200 may take different forms, and the present disclosure is not limited to any particular form. For example, the electronic device 200 may be a mobile communication device, such as, for example, a mobile station, head mountable display, a subscriber station, a wireless terminal, a smart phone, mobile device (similar to mobile device 108 of FIG. 1), a desktop computer (similar to desktop computer 106 of FIG. 1), a tablet (similar to tablet computer 114 of FIG. 1), a camera (similar to camera 116 of FIG. 1), etc., that is useable with data transfer applications, such as capturing and optical tracking of content. As described in more detail below, electronic device 200 may represent one or more tracking systems or one or more image processing devices. In certain embodiments, electronic device 200 may provide look-up tables for object volatility. In certain embodiments, electronic device 200 may provide object recognition through various CV and/or AI processes In the example shown in FIG. 2, the electronic device 200 includes an antenna 205, a communication unit 210, transmit (TX) processing circuitry 215, a microphone 220, and receive (RX) processing circuitry 225. The communication unit 210 may include, for example, a RF transceiver, a Bluetooth® transceiver, or a Wi-Fi® transceiver, and the like. The electronic device 200 also includes a speaker 230, a processor 240, an input/output (I/O) interface 245, an input 250, a display 255, a memory 260, and sensor(s) 265. The memory 260 includes an operating system (OS) 261 and one or more applications 262. Communication unit 210 can include additional communication interfaces, such as Bluetooth®, ZIGBEE, infrared, and the like.

The communication unit 210 receives, from the antenna 205, an incoming RF signal such as a Bluetooth® or Wi-Fi® signal from an access point (e.g., base station, Wi-Fi® router, Bluetooth® device) of the network 102 (e.g., a Wi-Fi®, Bluetooth®, cellular, 5G, LTE, LTE-A, WiMAX, or any other type of wireless network). The communication unit 210 may down-convert the incoming RF signal to generate an intermediate frequency or baseband signal. The intermediate frequency or baseband signal is sent to the RX processing circuitry 225, which generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data and/or image processing).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or intermediate frequency signal. The communication unit 210 receives the outgoing processed baseband or intermediate frequency signal from the TX processing circuitry 215 and up-converts the baseband or intermediate frequency signal to an RF signal that is transmitted via the antenna 205.

The processor 240 can include one or more processors or other processing devices and execute the OS 261 stored in the memory 260 in order to control the overall operation of the electronic device 200. For example, the processor 240 could control the reception of forward channel signals and the transmission of reverse channel signals by the communication unit 210, the RX processing circuitry 225, and the TX processing circuitry 215 in accordance with well-known principles. The processor 240 is also capable of controlling the optical tracking or SLAM to track one or more objects in the environment, or a combination thereof. The processor 240 is also capable of executing other applications 262 resident in the memory 260, such as, one or more applications for image processing, object recognition and optical tracking. In some embodiments, the processor 240 includes at least one microprocessor or microcontroller. The processor 240 executes instructions that may be stored in a memory 260. The processor 240 can include any suitable number(s) and type(s) of processors or other devices in any suitable arrangement. Example types of processor 240 include microprocessors, microcontrollers, digital signal processors, field programmable gate arrays, application specific integrated circuits, and discreet circuitry The processor 240 is also capable of executing other processes and programs resident in the memory 260, such as operations that receive, store, and timely instruct by providing image capturing and processing. The processor 240 can move data into or out of the memory 260 as required by an executing process. In some embodiments, the processor 240 is configured to execute a plurality of applications 262 based on the OS 261 or in response to signals received from eNBs or an operator. In some embodiments, the processor 240 is configured to execute a plurality of applications 262 based on for image processing for electronic device 200. The processor 240 is also coupled to the I/O interface 245, which provides the client devices 106-116 with the ability to connect to other devices such as laptop computers and handheld computers. The I/O interface 245 is the communication path between these accessories and the processor 240

The processor 240 is also coupled to the input 250 and the display 255. The operator of the electronic device 200 can use the input 250 to enter data or inputs, or a combination thereof, into the electronic device 200. Input 250 can be a keyboard, touch screen, mouse, track ball or other device capable of acting as a user interface to allow a user in interact with electronic device 200. For example, the input 250 can include a touch panel, a (digital) pen sensor, a key, or an ultrasonic input device. Input 250 may be associated with sensor(s) 265 and/or a camera by providing additional input to processor 240. In certain embodiments, sensor 265 includes inertial sensors (such as, accelerometers, gyroscope, and magnetometer), optical sensors, motion sensors, cameras, pressure sensors, heart rate sensors, altimeter, breath sensors (such as microphone 220), and the like. The touch panel can recognize a touch input in at least one scheme among a capacitive scheme, a pressure sensitive scheme, an infrared scheme, or an ultrasonic scheme. The input 250 also can include a control circuit. In the capacitive scheme, the input 250 is able to recognize a touch or proximity. The display 255 can be a liquid crystal display, light-emitting diode (LED) display, optical LED (OLED), active matrix OLED (AMOLED), or other display capable of rendering text and/or graphics, such as from websites, videos, games and images, and the like.

The memory 260 is coupled to the processor 240. Part of the memory 260 could include a random access memory (RAM), and another part of the memory 260 could include a Flash memory or other read-only memory (ROM). The memory 260 can include persistent storage (not shown) that represents any structure(s) capable of storing and facilitating retrieval of information (such as data, program code, and/or other suitable information on a temporary or permanent basis). The memory 260 can contain one or more components or devices supporting longer-term storage of data, such as a ready only memory, hard drive, Flash memory, or optical disc. The memory 260 also can contain image data 263 received from one or more image capturing devices (such as sensor 265). Image data 263 can contain single images or a movie. Image data 263 can contain tracking points associated with objects in each image.

Electronic device 200 further includes one or more sensor(s) 265 that can meter a physical quantity or detect an activation state of the electronic device 200 and convert metered or detected information into an electrical signal. For example, sensor(s) 265 can include one or more buttons for touch input, (such as on the headset or the electronic device 200), a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 265 can further include a control circuit for controlling at least one of the sensors included therein. The sensor(s) 265 can be used to determine an orientation and facing direction, as well as geographic location of the electronic device 200. Any of these sensor(s) 265 can be disposed within the electronic device 200, within a headset configured to hold the electronic device 200, or in both the headset and electronic device 200, such as in embodiments where the electronic device 200 includes a headset.

Although FIG. 2 illustrates one example of electronic device 200, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the electronic device 200 configured as a mobile telephone, tablet, or smartphone, the electronic device 200 could be configured to operate as other types of mobile or stationary devices.

Figure 3:
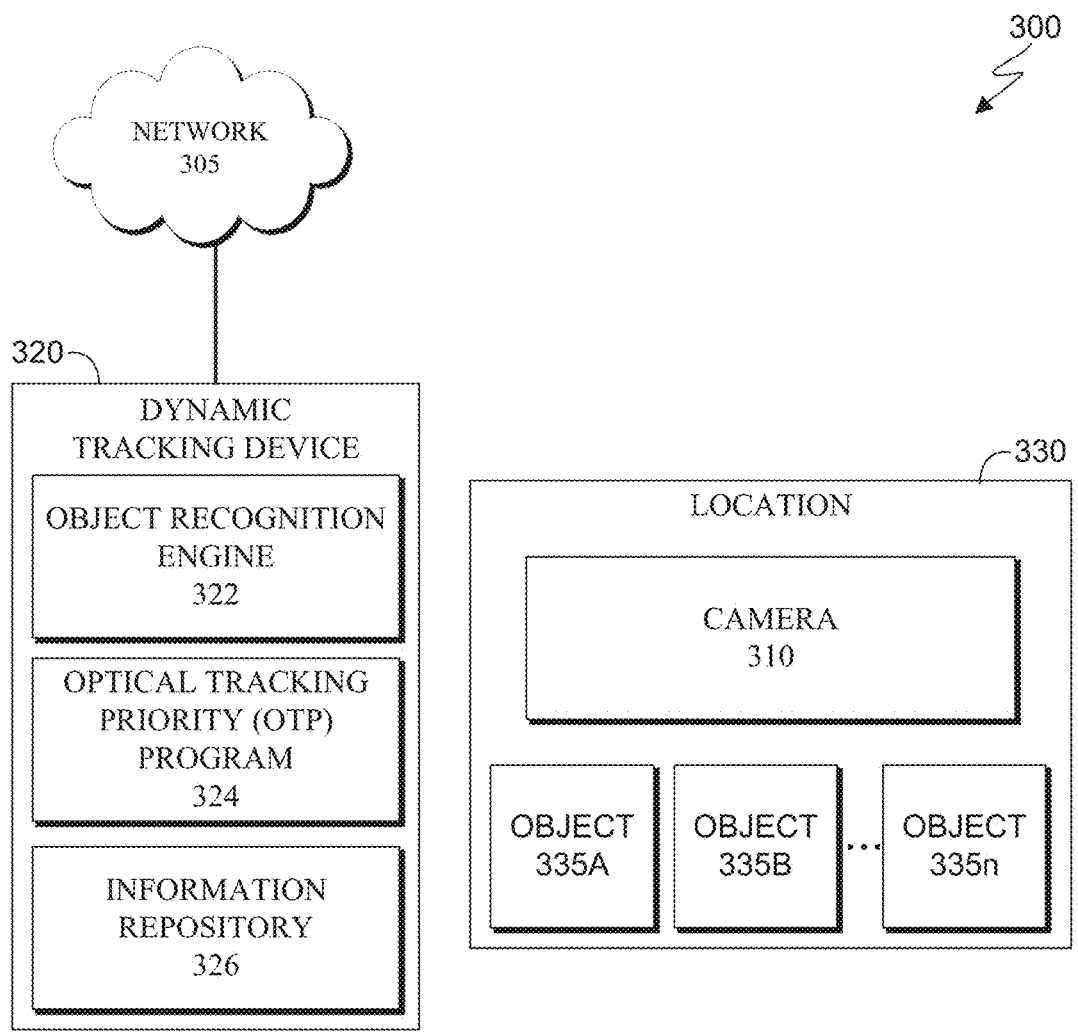
FIG. 3 illustrates an example block diagram of an environment in accordance with an embodiment of this disclosure.

FIG. 3 illustrates an example block diagram of an environment 300 in accordance with an embodiment of this disclosure. The block diagram is for illustration only, and other embodiments or illustrations could be used without departing from the scope of this disclosure.

In the example shown in FIG. 3, environment 300 includes camera 310, which can be configured like camera 116 of FIG. 1. The environment 300 also includes a dynamic tracking device 320, which can be configured similar to server 104 of FIG. 1, client devices 106-114 of FIG. 1, or electronic device 200 of FIG. 2. The environment 300 is interconnected over network 305, which can be the same as or similar to network 102 of FIG. 1 or may include stand-alone devices. Environment 300 also includes a plurality of objects 335A through 335n within location 330. Object 335A, object 335B, and object 335n represent any number of objects that can be tracked within location 330. Environment 300 also includes a remote server (not shown) interconnected with dynamic tracking device 320 through network 305.

In certain embodiments, network 305 is similar to network 102 of FIG. 1. In certain embodiments, network 305 is a computer network with a small geographic scope. Computer networks with a small geographic scope may range in size from Near Field Communication (NFC) to Local Area Networks (LANs). A computer network with a small geographic scope may not have a connection to the Internet or other remote networks. In certain embodiment, network 305 includes a larger networking environment. For example, network 305 can be used for communication among mobile devices themselves (intrapersonal communication) or for connecting to a higher level network (such as the Internet). In certain embodiment, network 305 represents a "cloud" of computers interconnected by one or more networks, where network 305 is a computing system utilizing clustered computers and components to act as a single pool of seamless resources when accessed.

In certain embodiments, network 305 connects camera 310 with dynamic tracking device 320. Network 305 also is able to provide communication medium between dynamic tracking device 320 and additional servers and equipment (not shown). For example, network 305 can be connected to an information repository (i.e., a database) that contains a look-up table of object volatility scores. In certain embodiments, network 305 is connected with one or more CV systems to assist in determining the identity of one or more objects. In certain embodiments, network 305 is connected with one or more AI systems to assist in determining the identity of one or more objects. In certain embodiments, network 305 is connected with one or more object recognition systems to assist in determining the identity of one or more objects.

Environment 300 depicts location 330. Location 330 represents a nonspecific area. Examples of location 330 include any location such as an education setting, a residence, an office complex, a retail store, a commercial building, an industrial building, and the like. Location 330 contains a number of objects, namely, object 335A, object 335B, through object 335n. Objects 335A, 335B, through 335n (cumulatively referred to as objects 335A-n) represent any number of physical objects in location 330 which can be physically moved, interacted with, and/or manipulated. Each object (objects 335A-n) can be a physical object. Examples of objects 335A-n range from structural components of location 330 (such as a wall, door, support column, and the like), machinery, an automobile, pictures hanging on a wall, a computer system, books, furniture, appliances, humans, animals, and the like. The descriptions associated with location 330 and objects 335A-n are not intended to be limiting, rather they are provided to for exemplary and explanatory purposes only. Location 330 is viewed by one or more cameras, such as camera 310.

Camera 310 is able to view an environment and convert the information into digital form. Camera 310 includes a sensor that is able to sense a position, or movement, or both, within its viewing radius. In certain embodiments, camera 310 includes one or more of a color camera, a video camera, a depth camera, a motion sensor, radar, or the like. In the example shown in FIG. 3, camera 310 is located in location 330, however those skilled in the art appreciate that camera 310 may be located anywhere. In certain embodiments, camera 310 is not limited to a singular device. That is, camera 310 can include any number of devices which can sense a position, or movement, or both, within location 330.

In certain embodiments, camera 310 is a frame-based camera similar to a red-green-blue camera. In certain embodiments, camera 310 is a complementary metal-oxide semiconductor (CMOS), charge couple device (CCD), infra-red (IR), ultraviolet (UV), depth sensor camera (i.e., RBG-D), an event-based camera, or another type of image sensor. Regardless of the type of camera, camera 310 is capable of generating a sequence of images and transmitting the images to dynamic tracking device 320.

In certain embodiments, camera 310 is a surveillance camera. In certain embodiments, camera 310 is attached to a head-mounted display. For example, as a user moves through an environment, such as, location 330, camera 310 is able to capture and transmit to dynamic tracking device the recorded images. The head-mounted display may be used for displaying augmented reality, virtual reality, mixed reality, and the like. The head-mounted display can include internal and external sensors such as a gyroscope, an accelerometer, or a combination of one or more sensor(s) 265 of FIG. 2. In certain embodiments, camera 310 is attached to one of: a mobile robot, an automatable, an autonomous device, a personal computer, or any computing device, or the like. In certain embodiments, camera 310 is attached dynamic tracking device 320.

Dynamic tracking device 320 communicates with camera 310 directly via a wire or indirectly via wireless communication, such as through network 305. Dynamic tracking device 320 communicates with additional servers and equipment (not shown) through network 305. In certain embodiments, dynamic tracking device 320 is a standalone device similar to client devices 106-116 of FIG. 1. In certain embodiments, dynamic tracking device 320 is a component of a larger device. Dynamic tracking device 320 detects, tracks, and records data associated with one or more physical objects in an environment, such as location 330. Dynamic tracking device 320 includes an object recognition engine 322, an optical tracking priority (OTP) program 324, and an information repository 326.

Object recognition engine 322 identifies objects in an image or video sequence. Object recognition engine 322 encompasses the process to identify specific objects in a digital image or video. Object recognition engine 322 identifies and segments objects 335A-n within an environment, such as, location 330. Each of the objects 335A-n may be identified and segmented using various AI and/or CV techniques through object recognition engine 322. In certain embodiments, object recognition engine 322 bases its analysis on matching a known object with an object in the image. In certain embodiments, object recognition engine 322 bases its analysis on machine learning to continually learn to identify new objects. In certain embodiments, object recognition engine 322 parses a received image from camera 310 to identify objects within the image. Object recognition engine 322 is able to identify objects that are partially occluded by other objects.

In the example shown in FIG. 3, object recognition engine 322 is disposed internal to dynamic tracking device 320. In certain embodiments, object recognition engine 322 is external to dynamic tracking device 320. For example, dynamic tracking device is able to access object recognition engine 322 through network 305.

In certain embodiments, object recognition engine 322 is pre-programmed to recognize certain objects. In certain embodiments, object recognition engine 322 includes any necessary CV or AI to recognize, classify or identify objects, such as objects 335A-n, within the environment. Object recognition engine 322 utilizes a plurality of sensors to determine various characteristics of the objects in order to identify them. For example, object recognition is able to identify an object's approximate size, color, and/or audio associated with each object.

In certain embodiments, upon identifying an object, object recognition engine 322 provides the identity of the object to OTP program 324. In certain embodiments, upon identifying an object, object recognition engine 322 provides the identity of the object as well as information about the object to OTP program 324. Information about the object includes a volatility score associated with the object.

OTP program 324 prioritizes tracking points of an optical tracking system based on object recognition and a volatility associated with each identified object. In certain embodiments, OTP program 324 utilizes a location and mapping system or an optical tracking system similar to a SLAM. In certain embodiments, OTP program 324 is a separate component of a location and mapping system similar to a SLAM solution for optical tracking.

During an optical tracking, similar to SLAM, object location and mapping are based on a cameras proximity to objects and structures within the environment. When the camera moves slightly or an object in the environment moves, the resulting image is different than the original image of the environment. The optical tracking then compares the two images, detects the difference and is able to determine how much an object moved. For example, if the camera moves in any direction, objects that are close to the camera have a larger displacement that object further away. Conversely, objects that are further from the camera have a smaller displacement than objects further away. Therefore, by repeatedly taking pictures and comparing objects within them, an optical tracking can determine (i) where objects are in three-dimensional space, and (ii) where the camera is relative to three dimensional spaces.

Optical tracking systems uses a plurality of tracking points associated with objects in the room, to match each tracking point as the camera moves throughout the room. For example, a single object may have no tracking points, thereby the optical tracking system is not tracking its location relative to that specific object. In another example, a single object may have only a single tracking point located on its surface, thereby the optical tracking system tracks its location relative to one point on the object. In another example, a single object may have multiple tracking points located on its surface, thereby the optical tracking system may track its location relative each tracking point on the object.

Optical tracking systems using a location and mapping system, similar to SLAM, can provide a location within an environment. For example, upon a mapping of location 330, if objects 335A-n do not move, then the next time the optical tracking system views location 330, the optical tracking system knows where it is. For example, optical tracking system may utilize the same tracking points as before to determine its location within location 330. Optical tracking problems start developing when objects in a location start to move in between two optical tracking sessions. For example, if object 335A has a tracking point associated with it and is moved, the optical tracking system loses the original tracking point, and may be required to find a new tracking point. If the optical tracking system is able to reference enough other tracking points, then no significant problems develop. For another example, if object 335A has a tracking point associated with it and object 335A is slightly moved, then the optical tracking system may still base its calculations on the original tracking point, even though it is not in its original location. Such calculations may render errors, as the system may not immediately know that the determined location of object 335 A is wrong.

Embodiments of the present disclosure provide for situations in which certain objects move regularly whereas other objects rarely move. Therefore, the OTP program 324 prioritizes tracking points for the optical tracking system in order to provide tracking points that are unlikely to move and thereby negatively influence a location and mapping of location 330. For example, based on object recognition determining an object is stable (that is, unlikely to move), OTP program 324 prioritizes any tracking points associated with the object. Conversely, based on object recognition determining an object is volatile (that is, un-stable and likely to move), OTP program 324 reduces the priority of any tracking points associated with the object.

In certain embodiments, OTP program 324 receives identified objects via from object recognition engine 322 in order to determine which objects in the environment are likely to move. In certain embodiments, OTP program 324 assigns a volatility score to each individual object detected and identified within location 330. A volatility score represents the likelihood an object is going to move. The score can be represented by a scale from likely to move to not likely to move. In an embodiment, the scale can have numerical numbers associated with it, such as 1-10, where 1 is not likely to move and 10 is very likely to move. In another embodiment, the scale can have letters associated with it, that is, letters A-Z, where 'A' is not likely to move and 'Z' is very likely to move. In another embodiment, the scale may be represented by colors. Those skilled in the art will appreciate that the term volatility score, as used herein, represents a likelihood of an object to move, and can be represented by a variety of scales.

Based on an object's volatility score, OTP program 324 prioritizes tracking points for the optical tracking system. For another example, OTP program 324 classifies each object in order to determine which objects in the environment are likely to move. For instance, OTP program 324 can assign each object to a specific category. Categories can be universal or tailored for each type of environment. Example categories can include, (i) human, (ii) furniture—volatile (i.e., a chair), (iii) furniture—nonvolatile (i.e., a desk), (iv) machinery, and the like. It is noted that this list is for illustration only and other examples could be used. Each category can have a volatility score associated with it. Thereafter, each object is assigned a generic volatility score, based on the category the object is assigned. For example, humans may have a high volatility score as humans regularly move, whereas certain machinery, which rarely moves, may have a low volatility score. The volatility score is associated with each individual object within the category.

Based on an objects volatility score, OTP program 324 prioritizes tracking points for the optical tracking system.

Generally, a volatility score refers to the nature of an object and its likelihood to move over a period of time. For example, a computer monitor, rarely moves, however the display may continually change. Therefore, the computer monitor base and display frame may have a low volatility score whereas the display itself has a high volatility score. For another example, picture frame on a wall is unlikely to move, and therefore given a low volatility score. For another example, a chair is likely to move and therefore will have a high volatility score. Assigning a volatility score will be discussed in greater detail below with reference to FIGS. 4A and 4B.

OTP program 324 can receive a listing of objects detected within location 330 from object recognition engine 322. In certain embodiments, the listing includes individual volatility scores associated with each individual object. In certain embodiments, OTP program 324 classifies each object into a category with a generic volatility score associated with each category. In certain embodiments, OTP program 324 knows the volatility scores associated with each individual object. In certain embodiments, OTP program 324 accesses information repository 326 to look-up volatility scores associated with each individual object.

Information repository 326 can be implemented using any architecture known in the art such as, for example, a relational database, an object-oriented database, or one or more tables, or a combination thereof. Information repository 326 stores data to assist object recognition engine 322 in identifying objects and to assist OTP program 324 in determining and/or assigning a volatility score associated with a wide range of objects. Information repository 326 can contain look-up tables, databases, charts, graphs, functions, equations, and the like that object recognition engine 322 or OTP program 324 can access. While depicted in dynamic tracking device 320, information repository 326 may be on a server, or a remote server, or a "cloud" of computers interconnected by one or more networks utilizing clustered computers and components to act as a single pool of seamless resources, accessible to dynamic tracking device 320 via network 305.

In certain embodiments, information repository 326 contains look-up tables that contain a volatility score assignment for different types of objects. OTP program 324 accesses information repository 326 to assign a volatility score for each identified object and for each new object identified in a location.

In certain embodiments, the OTP program 324 classifies identified objects based on an object's positional volatility or likelihood of movement. For example, once an object is identified, OTP program 324 classifies objects and assigns general volatility scores or assigns an individual volatility score to each object.

In certain embodiments, the OTP program 324 assigns a volatility score to an object when the object has at least a tracking point associated with it. In certain embodiments, the OTP program 324 assigns a volatility score to an object when the object has a certain number of tracking point associated with it.

Based on the objects assigned volatility score, OTP program 324 determines a priority rating for each tracking point associated with each object. The priority rating for each tracking point is based on the volatility score associated with each object. For example, tracking points associated with objects having a high volatility are given a lower priority than tracking points associated with objects having a low volatility. For example, if an object has a volatility score of 7, then each tracking point associated with that object is given a volatility score of 7. The priority score is based on analyzing the volatility score of each tracking point and then sorting the tracking points to identify the tracking points that are less volatile. In certain embodiments, a high volatility score typically yields a low priority score. For example, upon OTP program 324 assigning objects of high volatility a low priority, any tracking points associated with the object are given a low priority. Conversely, upon OTP program 324 assigning objects of low volatility a high priority, any tracking points associated with the object are given a high priority.

In certain embodiments, OTP program 324 sorts the priority ratings for each tracking point. Thereafter, OTP program 324 transmits the tracking points to the optical tracking system. By transmitting prioritized tracking points, OTP program 324 provides a preferred list of tracking points that are stable as the objects associated with each tracking point are non-volatile. Similarly by transmitting prioritized tracking points, OTP program 324 provides a non-preferential list of tracking points that are volatile as the objects associated with each tracking point are likely to move thereby yielding poor tracking points.

In certain embodiments, OTP program 324 includes a feedback sub-system (not shown). In certain embodiments, a feedback sub-system is a separate component of dynamic tracking device 320. The feedback sub-system allows OTP program 324 to update the volatility score of one or more objects within the location. For example, if an object that was given a low volatility score starts to move, OTP program 324 can increase the volatility score associated with that object. Similarly, if an object that was given a high volatility score rarely moves, OTP program 324 can decrease the volatility score associated with that object. Thereafter, OTP program 324 assigns new priority values to one or more tracking points.

In certain embodiments, the feedback sub-system updates the volatility score locally, that is, only affecting the volatility score of objects within the location of the optical tracking. In certain embodiments, the feedback sub-system universally updates the volatility score on an information repository that contains the volatility score of objects not limited to the location of the optical tracking. For example, OTP program 324 is able access a general information repository, containing a look-up table, when a volatility score is unknown. In certain embodiments, OTP program 324 updates a look-up table within information repository 326 to indicate the new volatility score of a specific object. Feedback process is discussed in further detail in reference to FIG. 7.

It is noted that every object identified by object recognition engine 322 may not have a tracking point associated with it. Similarly, in certain examples every object identified by object recognition engine 322 may have a volatility score assigned to it. In certain embodiments, every object identified by object recognition engine 322 has a volatility score assigned to it when it is associated with at least one tracking point. It is noted that every object identified by object recognition engine 322 may not have a priority rating. For example, if the identified object does not have a tracking point associated with it, the object will not have a priority rating. In certain embodiments, each tracking point will have a priority rating, if the object associated with the tracking point is identified and assigned a volatility score. In certain embodiments, most tracking points will have a priority rating. In certain embodiments, tracking points associated with a single object are assigned that object's volatility score.

In certain embodiments, optical tracking systems utilizing the OTP program 324 may detect a reflectiveness value of an object. A reflectiveness value correlates to an objects ability to reflect or absorb ambient light. High reflective values are generally associated with objects that are glossy, shiny, polished, and the like. Low reflective values are generally associated with objects that are dull, matte, unpolished, and the like. For example, a mirror or polished metal generally have high reflective values. If the reflectiveness value is above a threshold, the OTP program 324 may discard each tracking points associated with the object. For example, upon identifying an object has a high reflectiveness value, such as a mirror or glass, the OTP program 324 may discard any tracking points associated with the mirror, as any objects detected in the mirrors reflection are not the objects true location and may provide errors while tracking the environment.

In certain embodiments, optical tracking systems utilizing an object recognition engine, identify objects in a location which would provide a preferred tracking point location. For example, upon identifying an object with a low volatility score, OTP program 324 can suggest to the tracking system to generate one or more tracking points associated with the object.

In certain embodiments, optical tracking systems utilizing the OTP program 324 identify if an object moved. Thereafter, optical tracking systems determine a position to which the object has moved. Such determination may utilize an aspect of the object recognition engine 322. By identifying objects 335A-n in the location 330, the OTP program 324 (or the optical tracking system) can identify, for example, the new location of object 335A, when object 335A has moved within location 330.

In certain embodiments, optical tracking systems utilizing the OTP program 324 identify objects that are semi-occluded. In certain embodiments optical tracking systems utilizing the OTP program 324 identify objects that were semi occluded by an object that was moved. Therefore, by incorporating an object recognition engine 322 into an optical tracking environment, a reduction of false positives for locating tracking points may be achieved.

Figure 4A:
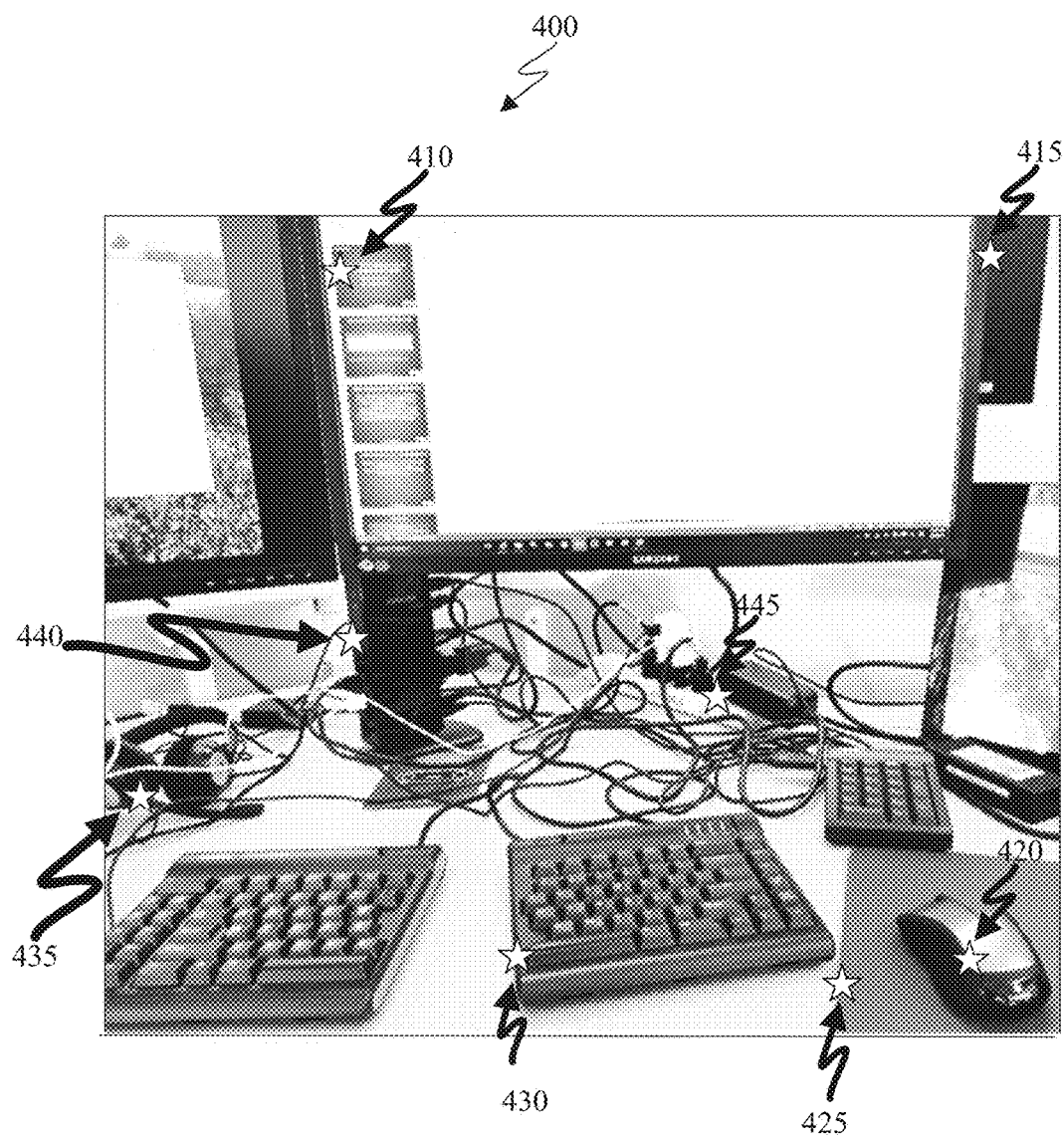
FIG. 4A illustrates an example environment for optical tracking in accordance with an embodiment of this disclosure.
Figure 4B:
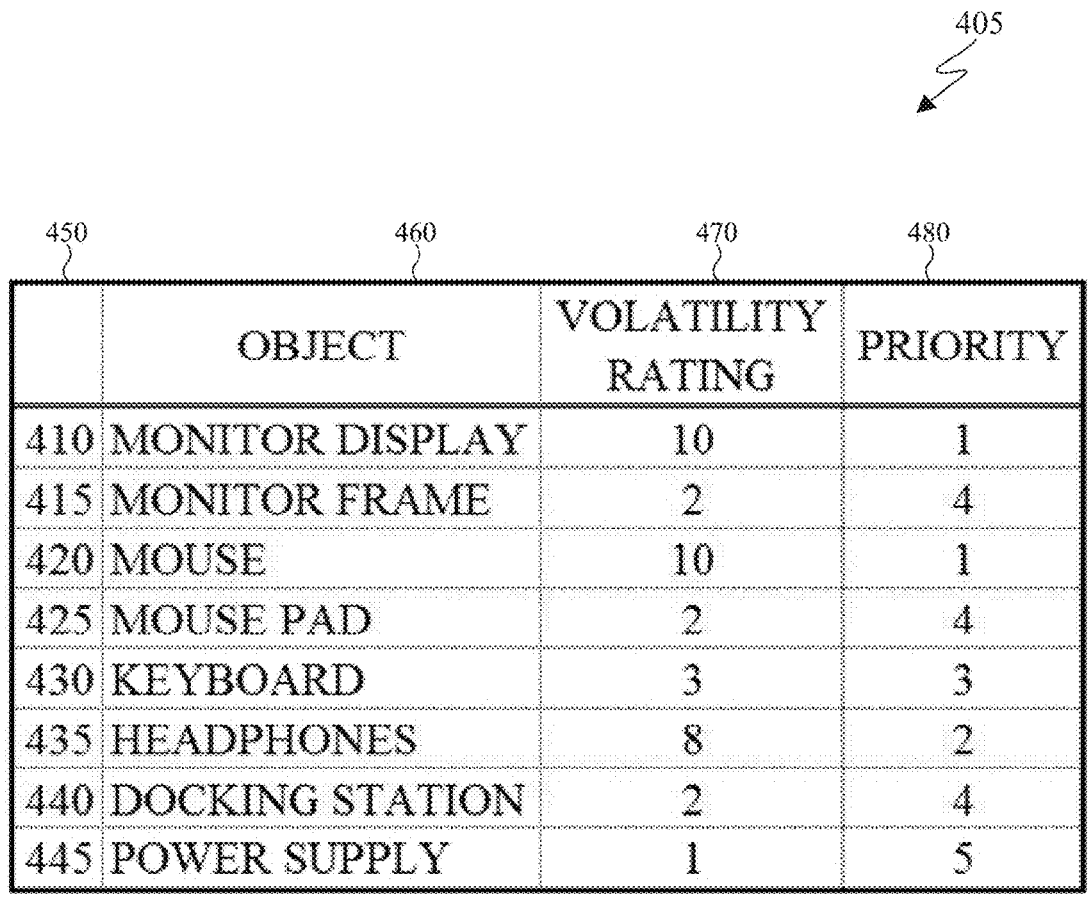
FIG. 4B illustrates an example table depicting various aspects of FIG. 4A, in accordance with an embodiment of this disclosure.

FIG. 4A illustrates an example environment for optical tracking in accordance with an embodiment of this disclosure. FIG. 4B illustrates an example table depicting various aspects of FIG. 4A, in accordance with an embodiment of this disclosure. The embodiments of the environment 400 and table 405 shown in FIGS. 4A and 4B are for illustration purposes only. For example, FIGS. 4A and 4B illustrate how dynamic tracking device 320 of FIG. 3 prioritizes tracking points. The embodiments could be used in any other suitable environment 400 using different embodiments and data for table 405.

In the example shown in FIG. 4A, the environment 400 is an image of an example office environment. The environment 400 includes a number of tracking points 410, 415, 420, 425, 430, 435, 440, and 445, which are scattered around the environment 400. Each tracking point was generated by an optical tracking system.

FIG. 4B illustrates table 405 that contains information regarding each tracking point. For example, each tracking point 410, 415, 420, 425, 430, 435, 440, and 445 of FIG. 4A is delineated in column 450 of table 405. Those skilled in the art appreciate that object recognition engine 322 of FIG. 3 is able identify additional objects in image 400, however, for explanation purposes, only objects associated with a tracking point are addressed.

Environment 400 includes a wide variety of objects that may be found on a computer desk located in an office environment. Object recognition engine 322 identifies each object associated with a tracking point in column 460 of table 405. For example, (i) tracking point 410 is on the display portion on a computer monitor; (ii) tracking point 415 is on the frame of a computer monitor; (iii) tracking point 420 is on a computer mouse; (iv) tracking point 425 is on a mouse pad; (v) tracking point 430 on a computer keyboard; (vi) tracking point 435 on a pair of headphones; (vii) tracking point 440 on a computer docking station; and (viii) tracking point 445 on a power supply strip. Object recognition engine 322 is able to identify each object as well differentiate portions of an object that may exhibit different volatility scores (such as, the monitor display at tracking point 410 and the monitor frame at tracking point 415).

OTP program 324 looks up a volatility score associated with each object in information repository 326 of FIG. 3. As shown in column 470 of table 405, the volatility score ranges from 1 to 10, with 1 representing low volatility and 10 representing a high volatility. For example, tracking point 410, has a volatility score of 10 (a high volatility), as the display of a computer monitor is continually changing as the computer functions. Tracking point 415 has a volatility score of 2 (a low volatility), as the frame of a monitor rarely moves or changes. Tracking point 420 has a volatility score of 10 (a high volatility), as a computer mouse is regularly moved as a method of user input on a computer. Tracking point 425 has a volatility score of 2 (a low volatility), as the mouse pad rarely moves, even though the mouse (tracking point 420) might move. Tracking point 430 has a volatility score of 3 (a low volatility), as a keyboard normally remains in the same position. Tracking point 435 has a volatility score of 8 (a high volatility), as headphones are regularly used and therefore rarely placed in the exact position after use. Tracking point 440 has a volatility score of 2 (a low volatility), as a docking station, once set up rarely moves or changes. Finally, tracking point 445 has a volatility score of 1 (a low volatility), as a power supply strip rarely moved or changes.

OTP program 324 determines a priority rating for each tracking point based on the volatility score of each object associated with a tracking point. In certain embodiments, OTP program 324 sorts the objects based on the volatility rating and then assigns priority values for each tracking point. In certain embodiments, OTP program 324 assigns priority values for each tracking point based on a relative volatility of each object. Column 480 of table 405 lists the priority rating for each object ranging from 1-5, with 1 being a low priority and 5 being a high priority tracking point. Therefore, when the optical tracking system attempts to track the office environment of image 400, the optical tracking system can disregard tracking points with a low priority, such as tracking points 410, 420 and 435. In certain embodiments, the optical tracking system places more weight on tracking points with a high priority, such as tracking points 415, 425, 440, and 445. In certain embodiments, optical tracking system disregards tracking points with a low priority and creates new tracking points. If the objects are already identified, then OTP program 324 notifies the optical tracking system of an updated priority value for each tracking point. If the objects are not already identified, object recognition engine 322 identifies the objects. In certain embodiments, if object recognition engine 322 is unable to identify an object, then the tracking point associated with that object is assigned an unknown rating, disregarded, assigned a generic volatility score, or the like.

Figure 5:
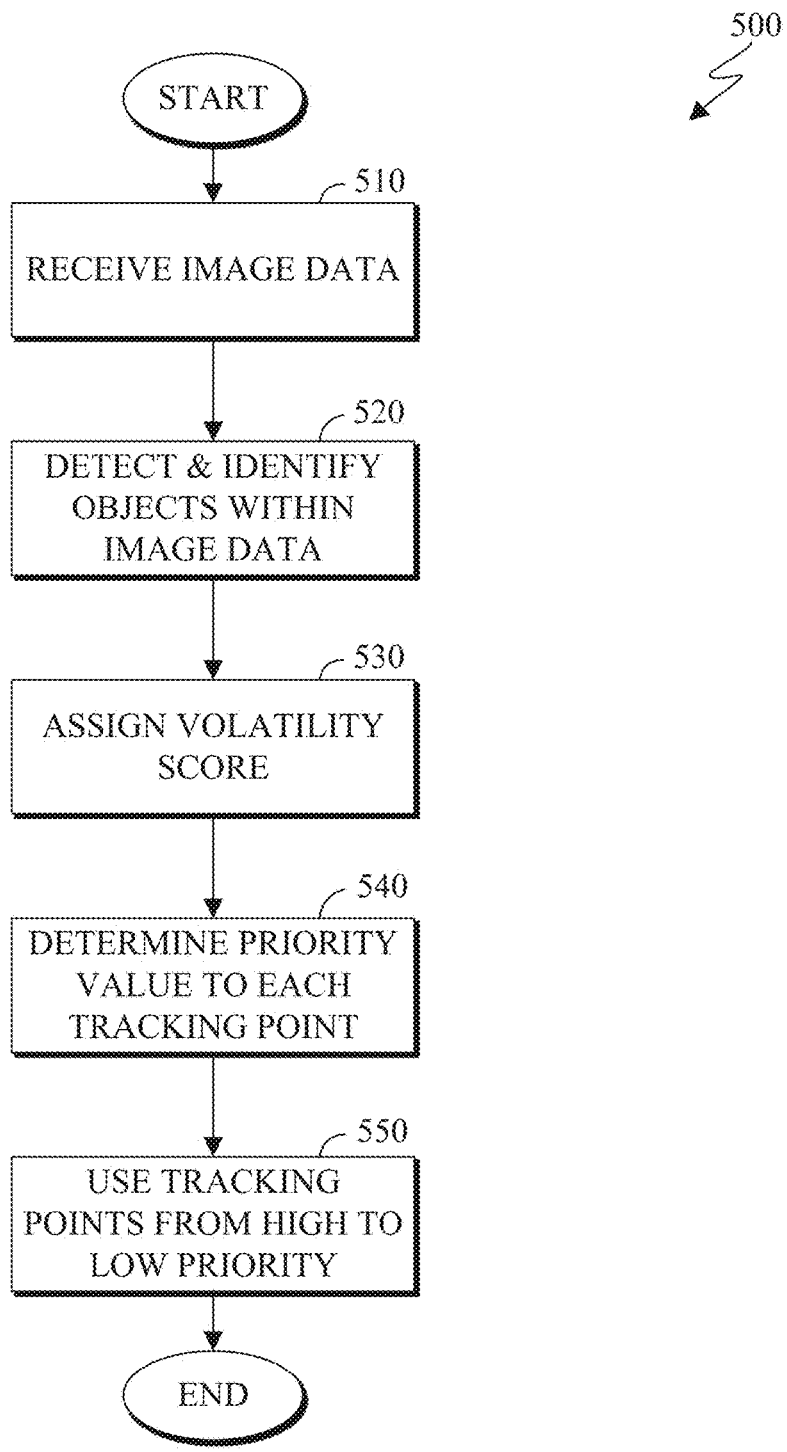
FIG. 5 illustrates an example method for optical tracking in accordance with an embodiment of this disclosure.

FIG. 5 illustrates an example process for optical tracking in accordance with an embodiment of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method 500 is described with respect to the system 100 of FIG. 1 and environment 300 of FIG. 3. However, the method 500 could be used with any other suitable system.

In block 510, dynamic tracking device 320 receives image data from one or more cameras. The optical tracking system commences and starts detecting objects and mapping locations, such as via a SLAM system or the like. The OTP program 324 commences parsing the image data to search for objects.

In block 520, dynamic tracking device 320 detects and identifies objects within the image data. For example, OTP program 324, or object recognition engine 322, searches the scene for objects. The search may be assisted by AI or CV techniques such as machine learning and neural networks. Upon detecting an object within the scene, object recognition engine 322 determines the identity of the object. In certain embodiments, object recognition engine 322 determines a classification of the object. Object recognition engine 322 accesses a local or remote server to identify the object. Object recognition engine 322 stores the identity of the object locally.

In certain embodiments, dynamic tracking device 320 may detect a reflectiveness value of each identified object. If the reflectiveness value is below a threshold the process continues with block 530. If the reflectiveness value is above a threshold dynamic tracking device 320 may discard each tracking points associated with the identified object. In an embodiment the reflectiveness threshold is based on whether the dynamic tracking device 320 can detect objects reflected from the object, such as a mirror or polished metal, as such reflections may provide incorrect tracking points.

In block 530, dynamic tracking device 320 assigns a volatility score to each object. The volatility score assigned to each object can be based on the object's identity or the likelihood the object may move, or a combination thereof. The volatility score can be located on a local information repository or on a remote server. The dynamic tracking device 320 saves the volatility score of each object in a local information repository.

In certain embodiments, if an object cannot be identified, then a default or predetermined volatility is assigned to each unidentified object. In certain embodiments, the dynamic tracking device 320 predicts the volatility of an object based on information derived about the object. For example, based on the shape, and position, of the object, a volatility score may be derived. Similarly, the dynamic tracking device 320 analyzes the environment and determines an approximate volatility based on the other objects detected within the environment. For another example, the dynamic tracking device 320 determines a volatility score for the unidentified object based on a recorded history of the object. For example, if the dynamic tracking device 320 reviews through previous image data the object, and determines the object has not moved, over a period of time, a low volatility is assigned to the object that has not moved. If however the dynamic tracking device 320 identifies that the object has moved throughout the environment, a high volatility score is assigned to the object that has moved.

In block 540, the dynamic tracking device 320 determines a priority value to each tracking point. The optical tracking system commences and starts detecting objects and mapping location, such as via a SLAM system or the like, by creating tracking points. Each tracking point can be associated with an object in the location. Objects within the location may have more than one tracking point. The location and mapping system communicates with OTP program 324 and shares the location of each tracking point. OTP program 324 then identifies each object that is associated with at least one tracking point. For example, upon a commencement of a location and mapping system, such as SLAM, for each tracking point, the OTP program 324 identifies objects associated therewith. For example, the OTP program 324 determines the object related to each tracking point. Once identifying the object, the OTP program 324 assigns a volatility score to each tracking point. The volatility score assigned to each track point is based on the volatility score of the object associated with each tracking point. For example, if a tracking point is on a wall, the wall may have a volatility score of zero because the wall will not move, then that tracking point is assigned a volatility score of zero as well. Similarly, if a tracking point is on a coffee mug located on a desk, the coffee mug may have a high volatility score, because the coffee mug is likely to move, then that tracking point is also assigned a high volatility score as well. Similarly, if the coffee mug has more than one tracking point associated with the coffee mug, each tracking point is given the same high volatility score.

After assigning volatility scores to each tracking point, the dynamic tracking device 320 then determines a priority order for each tracking point. For example, the tracking point priority is based on the volatility of the object with which the tracking point is associated. If the volatility score of a tracking point is high, such as because the object is likely to move, then the dynamic tracking device 320 assigns the tracking point a low priority value. Similarly, if the volatility score of a tracking point is low, such as because the object is less likely to move, then the dynamic tracking device 320 assigns the tracking point a high priority value. In certain embodiments, the dynamic tracking device 320 assigns priority values based on a linear method. For example, each tracking point priority value has a 1:1 correlation to the volatility score. For each tracking points, a direct correlation exist between the volatility score and the priority value. The dynamic tracking device 320 assigns, to each tracking point having a low volatility, a priority value that is a multiple higher than priority values of tracking points having a high volatility score. In certain embodiments, the dynamic tracking device 320 assigns priority values based on an exponential method. The dynamic tracking device 320 assigns, to each tracking point with a low volatility, a priority value an exponentially higher than priority values of tracking points with a high volatility score. In certain embodiments, the dynamic tracking device 320 assigns priority values based on a weighted priority method. For example, tracking points associated with a low volatility object can have a priority value that more heavily weighted than a tracking point associated with a mid-to-low volatility object. Similarly, tracking points associated with a high volatility object can have a priority value more heavily weighted than a tracking point associated with a high-to-mid volatility object. The dynamic tracking device 320 assigns a significantly higher priority to tracking points associated with objects having a very low volatility score as compared to tracking points associated with objects having a mid-to-low volatility score. Similarly, significantly less priority is given to tracking points associated with objects having a high volatility score compared to tracking points associated with objects having a high-to-mid volatility score. Those skilled in the art will appreciate a wide variety of approaches to assign priority values to each tracking point, based on the volatility score of an object with which the tracking point is associated.

In block 550, the dynamic tracking device 320 instructs the optical tracking system to use tracking points with a higher priority than tracking points with a lower priority. By an optical tracking system basing its volatility on tracking points associated with objects that are less likely to move, the optical tracking system is able to produce less errors and miscalculations as the tracking points are not lost. For example, if a tracking point is lost, such as when the object associated with the tracking point is moved, the optical tracking system may have to create a new tracking point and perform location calculations based on the new tracking point. Similarly, if a tracking point is shifted slightly, such as when the object associated with the tracking point is moved slightly but remains in the general area, the optical tracking system might not recognize that the tracking point has shifted, and therefore any future location and mapping processes could be off and may result in errors.

In certain embodiments, the optical tracking system searches for objects with low priorities, namely, objects that are likely to move, in order to recognize that a specific object has moved from location A to location B within the environment. In certain embodiments, the optical tracking system searches for new tracking points if a certain threshold of tracking points has a low priority value, that is, the object associated with the tracking point is highly volatile.

Figure 6A:
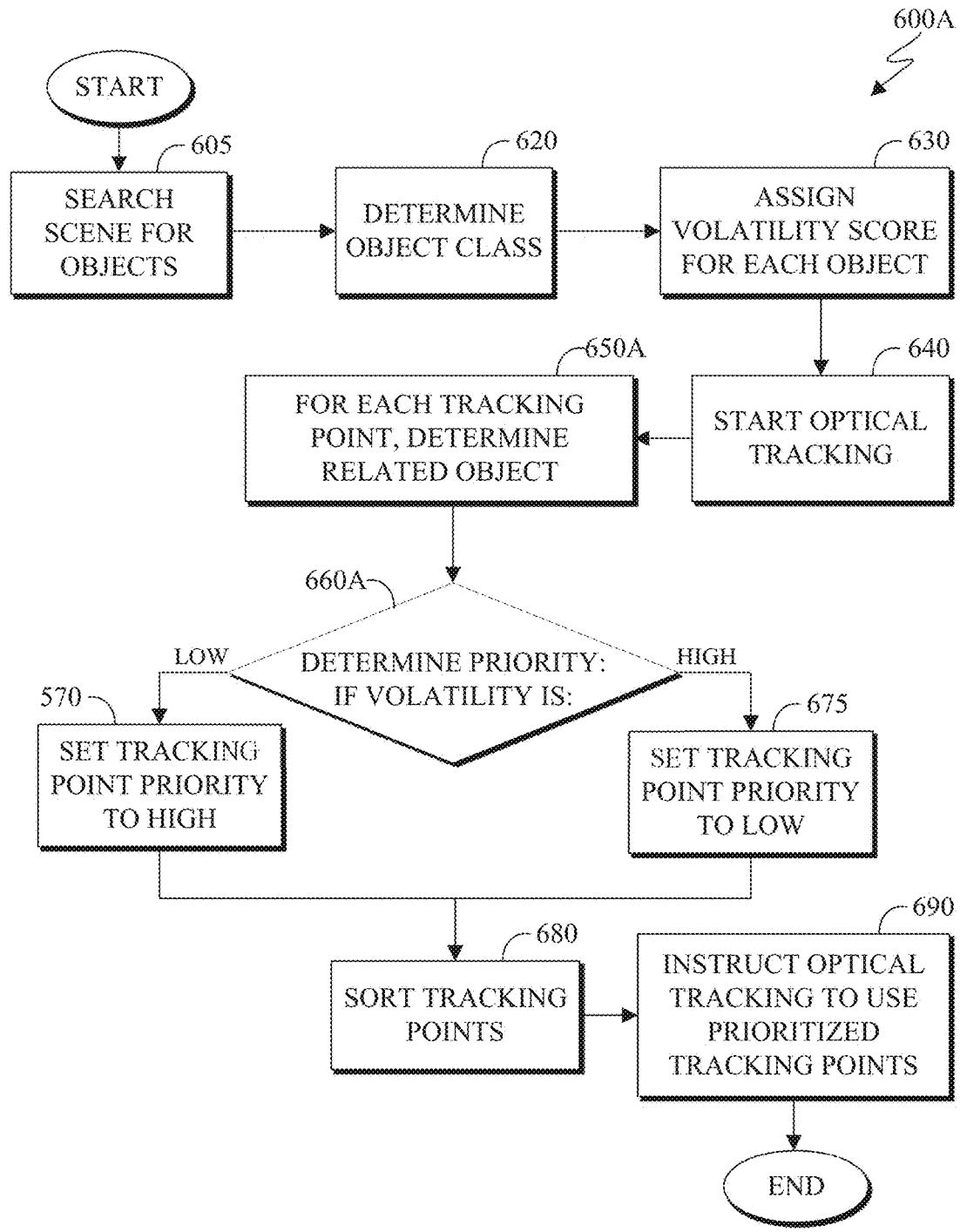
FIGS. 6A, 6B and 6C illustrate example sub-process for optical tracking in accordance with an embodiment of this disclosure.
Figure 6B:
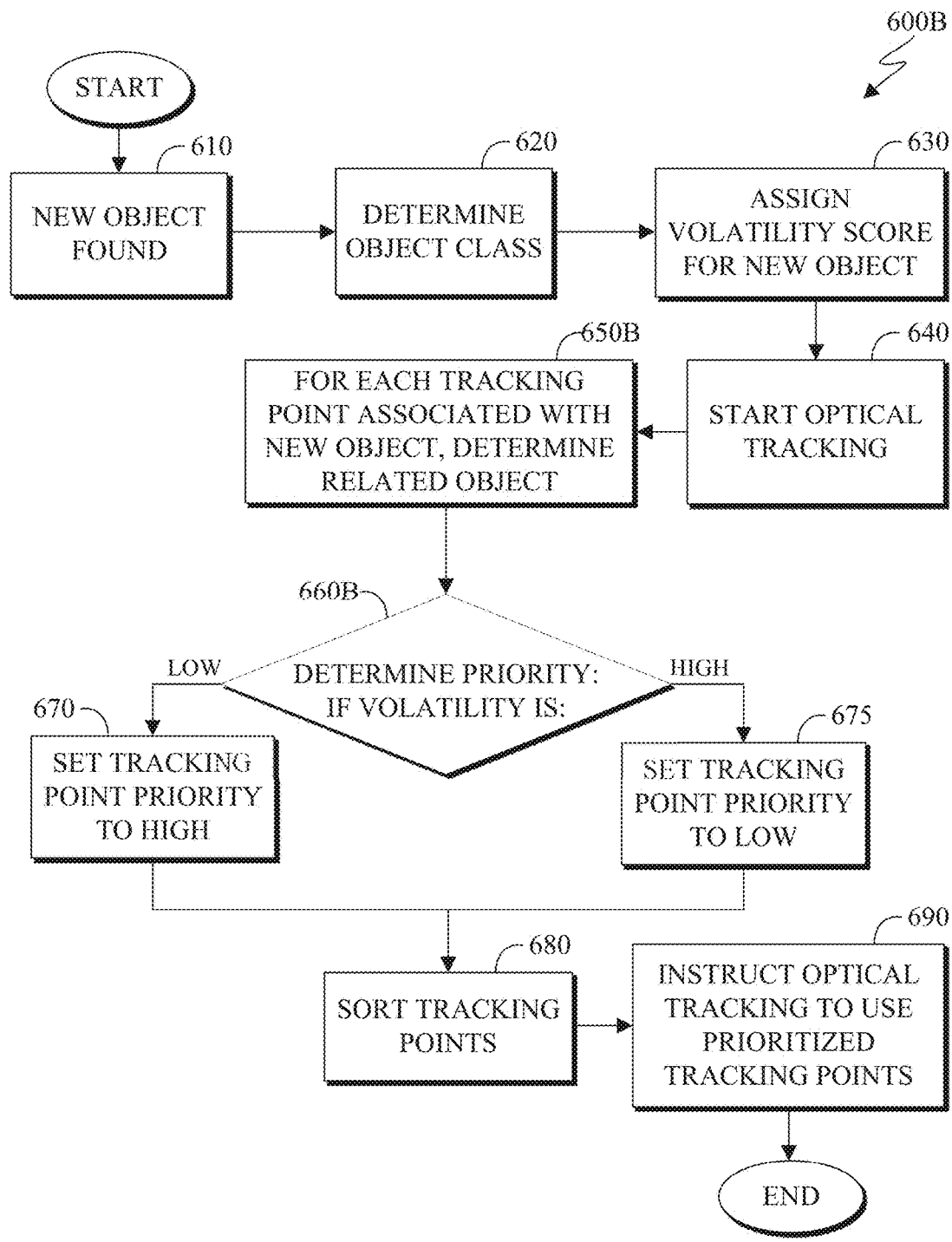
Figure 6C:
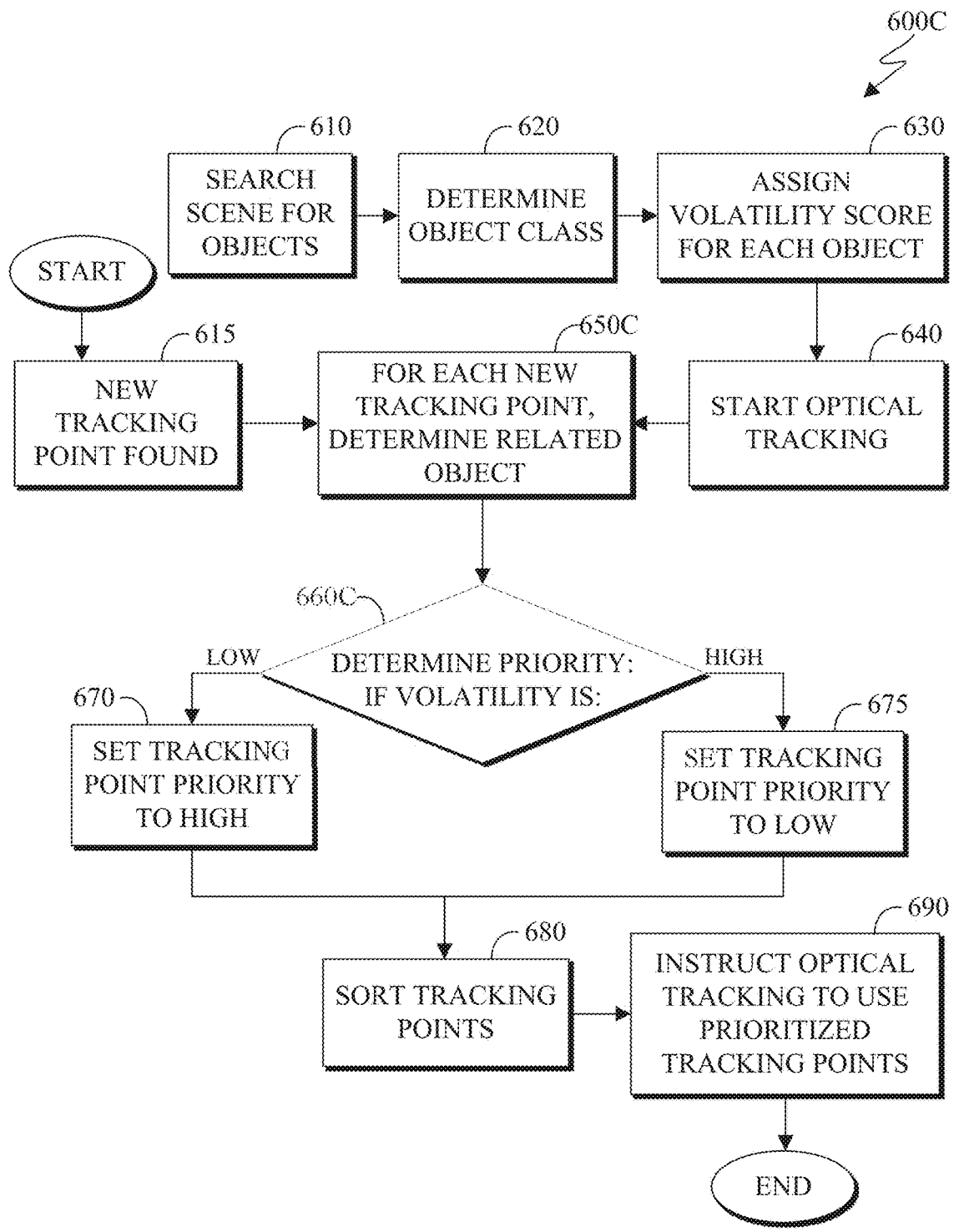

FIGS. 6A-C illustrate example sub-processes for optical tracking in accordance with an embodiment of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the processes 600A, 600B and 600C are described with respect to the system 100 of FIG. 1 and environment 300 of FIG. 3. However, the processes 600A, 600B and 600C could be used with any other suitable system.

FIGS. 6A, 6B, and 6C illustrate similar sub-processes that differ in an illustrated starting position. For example, FIG. 6A illustrates process 600A, which depicts a similar flow to that of FIG. 5, that is, the process begins with learning a new environment and prioritizing tracking points. FIG. 6B illustrates process 600B, which depicts the process of prioritizing tracking points responsive to detecting a new object in a known environment. FIG. 6C illustrates process 600C, which is a process of prioritizing tracking points responsive to identifying a new tracking point with a known environment.

In block 605, dynamic tracking device 320 receives image data from one or more cameras. The dynamic tracking device 320 searches the scene for object(s). For example, the OTP program 324 commences parsing the image data to search for objects.

In block 620, upon detecting objects within the image data the dynamic tracking device 320 identifies and determines the objects class or identity. The objects class can be represented by a general object, for example a chair, whereas the object's identity can be the type of chair. For example, the dynamic tracking device 320 searches the scene for objects. The search may be assisted by AI or CV techniques, such as machine learning and neural networks. Upon detecting an object within the scene, object recognition engine 322 determines the identity of the object. In certain embodiments, object recognition engine 322 determines a classification of the object. If available, object recognition engine 322 accesses a local or remote server to identify the object.

In block 630, the dynamic tracking device 320 assigns a volatility score to each identified object. The volatility score assigned to each object can be based on the object's identity or the likelihood the object may move, or a combination thereof. The volatility score can be stored on a local information repository or on a remote server. The dynamic tracking device 320 also saves the volatility score of each object in a local information repository.

In block 640, the optical tracking system, namely the dynamic tracking device 320, commences and creates tracking points through the environment. In block 650A, the dynamic tracking device 320 identifies the related objects the tracking points are associated with. The information can be located in the loop up table per block 630. Upon identifying the object and the object's volatility score, the dynamic tracking device 320 assigns a volatility score to each tracking point. If the object a tracking point is associated with is unknown that tracking point can be assigned a predetermined volatility score or skipped.

In block 660A, the dynamic tracking device 320 determines the priority value for each tracking point based on the volatility of the object. For example, if the volatility is low because the object associated with the tracking point is not likely to move, the process sets a high priority value for the tracking point in block 670. If the volatility is high because the object associated with the tracking point is likely to move, the dynamic tracking device 320 sets a low priority value for the tracking point in block 675. The dynamic tracking device 320 repeats block 660A for each tracking point. In block 660A, the dynamic tracking device 320 addresses at each tracking point individually when assigning priority values or looks at the totality of all tracking points and the associated volatility score to assign a range of priority values.

In block 680 the dynamic tracking device 320 sorts the tracking points based on the priority level associated with each tracking point. The sorted tracking points are stored in an information repository. Thereafter, in block 690, the process instructs the optical tracking solution to use the prioritized tracking points.

Process 600B is similar to process 600A, except for the beginning at block 610. Blocks 620, 630, 640, and 670-690 of FIG. 6A and FIG. 6B are substantially identical, and therefore details of the steps are previously addressed above and are omitted here for brevity.

In block 610, the dynamic tracking device 320 detects a new object in the environment. In certain embodiments, the object is detected as the camera is moved to a new location and is now able to view the object that was previously occluded. In certain embodiment, the object is detected as it was moved into the environment from an outside force, such as a human. In certain embodiments, the object is newly identified and object recognition engine 322 was unable to identify the object previously. Upon finding a new object, the dynamic tracking device 320 continues as before through blocks 620, 630, and 640.

In block 650B the dynamic tracking device 320 identifies each tracking point associated with the newly found object. If no tracking points are associated with the new object, then the dynamic tracking device 320 concludes or proceeds under process 600A. If at least one tracking point is associated with the new object, then dynamic tracking device 320 assigns, to each tracking point, a volatility score associated with the new object.

In certain embodiments, the dynamic tracking device 320 determines a priority for each tracking point associated with the new object in block 660B. In certain embodiment, the dynamic tracking device 320 re-prioritizes the priorities of all tracking points within the environment based on the addition of new tracking points. Upon prioritizing the tracking points, the dynamic tracking device 320 continues as before through steps 670, 675, 680, and 690.

Process 600C is similar to process 600A. Blocks 610 through 640, are discolored in FIG. 6C as the blocks are not addressed in the description of process 600C. It is also noted that blocks 670-690 of FIG. 6A, and FIG. 6C are substantially identical, and therefore details of the steps previously addressed above are omitted here for brevity.

In block 615, the dynamic tracking device 320 identifies a new tracking point within the environment. The new tracking point can be created by the optical tracking system.

In block 650C, for the new tracking point, the dynamic tracking device 320 determines the object associated with the tracking point. If the object is already known, the dynamic tracking device 320 assigns, to the tracking point, a volatility score associated with the object. If the object is not known, the dynamic tracking device 320, through object recognition, determines the identity or classification, or both, of the object. Upon identifying the object, and acquiring a volatility score associated with the object, the dynamic tracking device 320 assigns, to the new tracking point, a volatility score that matches that of the object. If the object cannot be identified, then a default volatility is assigned to the tracking point. In certain embodiments, the dynamic tracking device 320 predicts the volatility of an object based on information derived about the object. For example, based on the shape and position of the object, a volatility score is derived. Similarly, the dynamic tracking device 320 analyzes the environment and determines an approximate volatility based on the other objects detected within the environment.

In block 660C the dynamic tracking device 320 determines the priority for each new tracking point. In certain embodiments, the dynamic tracking device 320 re-prioritizes the priorities of all tracking points within the environment based on the addition of new tracking point. Upon prioritizing the tracking point(s), the dynamic tracking device 320 continues as before through blocks 670, 675, 680, and 690.

Figure 7:
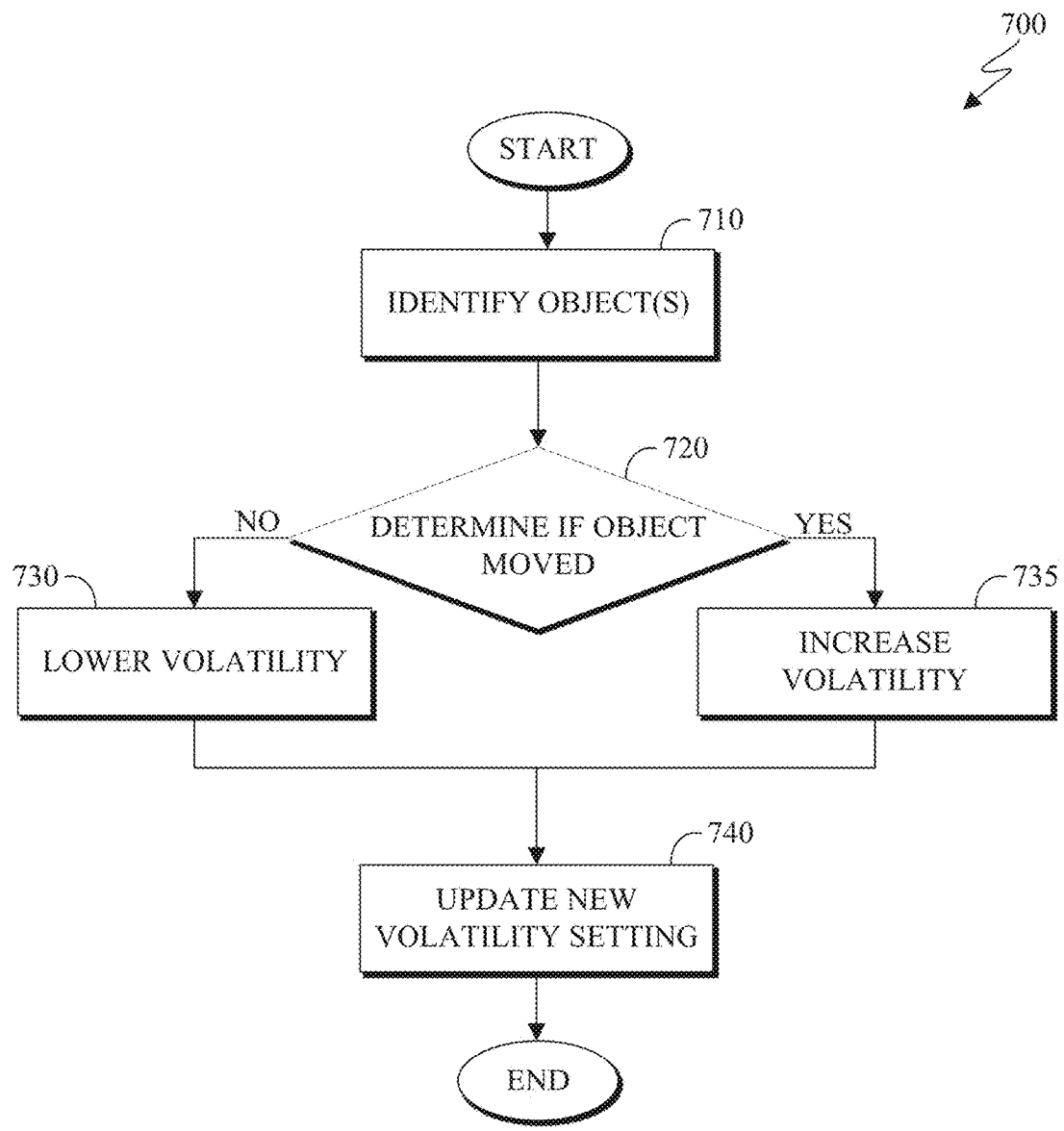
FIG. 7 illustrates an example feedback process in accordance with an embodiment of this disclosure.

FIG. 7 illustrates an example feedback process in accordance with an embodiment of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the feedback process 700 is described with respect to the system 100 of FIG. 1 and environment 300 of FIG. 3. However, the method 500 could be used with any other suitable system.

In the feedback process 700, the optical tracking system reevaluates the volatility of each identified object. In certain embodiments, the dynamic tracking device 320 periodically checks and reevaluates whether an object has moved and adjusts the volatility score associated with the object. The dynamic tracking device 320 randomly reevaluates and checks each object or the dynamic tracking device 320 can have a schedule to rotate through each object. Upon updating a volatility score, the dynamic tracking device 320 updates a larger database that is maintained by a server. Upon updating a volatility score, the dynamic tracking device 320 associates the object with a particular type of environment, such as an office, a class room, a commercial building, a ritual building, and so forth. For example, an object locating in one type of environment may generally have a low volatility score, but in a second environment the object may have a high volatility score. In certain embodiments, through the feedback process 700, the optical tracking system is able to learn the volatility of an unknown or unidentified object within the environment.

In block 710, dynamic tracking device 320 detects and identifies an object in the environment. Herein, the term 'identified' illustrates that an individual object is distinguishable between other objects within the environment. The actual identity of the object need know be known.

Over a period of time, the dynamic tracking device 320 determines whether an object has moved in the environment, in block 720. If the dynamic tracking device 320 determines, in block 720, that the identified object has not moved, then in block 730 the dynamic tracking device 320 lowers the volatility score. If the dynamic tracking device 320 determines in block 720, that the identified object has moved, then in block 735 the dynamic tracking device 320 increases the volatility score. In block 740 the dynamic tracking device 320 updates the volatility score for the identified object. In certain embodiments, upon updating a volatility score in the feedback process 700, the dynamic tracking device 320 returns to method 500, and reprioritizes tracking points, such as in block 540.

Although FIGS. 5, 6A-C, and 7 illustrate examples of processes prioritizing tracking points of an optical tracking, various changes could be made to FIG. 5, 6A-C, or 7. For example, while shown as a series of steps, various steps in each figure could overlap, occur in parallel, occur in a different order, or occur multiple times. In another example, steps may be omitted or replaced by other steps. For example, blocks 510 and 520 of FIG. 5 may be combined into one block or block 510 may be omitted. Similarly, block 550 of FIG. 5 may merely provide a notification of tracking point priorities to an optical tracking. In another example, FIG. 7 may be incorporated into any of FIG. 5 or 6A-6C.

Although the figures illustrate different examples of user equipment, various changes may be made to the figures. For example, the electronic device can include any number of each component in any suitable arrangement. In general, the figures do not limit the scope of this disclosure to any particular configuration(s). Moreover, while figures illustrate operational environments in which various electronic device features disclosed in this disclosure can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member,"

"apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for optical tracking, the method comprising:
identifying at least one object within an environment, from received image data;
assigning a volatility rating to the identified object;
determining one or more tracking points associated with the identified object;
determining a priority rating for the each of the one or more tracking points associated with the identified object based on the assigned volatility rating of the identified object; and
selecting the one or more tracking points for optical tracking based on the priority rating.

2. The method of claim 1, further comprising:
generating, the volatility rating for the identified object based on a tendency of the identified object to move within the environment.

3. The method of claim 1, wherein identifying the object, further comprises:
segmenting the environment to derive each object of the at least one object; and
identifying each of the derived objects based on object recognition.

4. The method of claim 1, further comprising:
detecting and identifying a second object within the environment;
assigning a volatility rating to the second object;
determining one or more tracking points associated with the second object; and
determining a priority rating for each of the one or more tracking points associated with the second object based on the assigned volatility rating of the second object.

5. The method of claim 1, further comprising:
detecting an additional tracking point associated with the identified object; and
determining a priority rating for the additional tracking point based on the volatility rating for the respective identified object.

6. The method of claim 1, further comprising:
determining whether at least one of the identified objects moved over a period of time;
responsive to determining the object moved, increasing the assigned volatility rating for the object;
responsive to determining the object has not moved, decreasing the assigned volatility rating for the respective identified object; and
updating the determined priority rating for each of the one or more tracking points associated with the object based on a change to the volatility rating.

7. The method of claim 1, further comprising:
discarding each tracking point with a priority rating below a threshold; and
determining a new tracking point associated with the at least one identified object with a low volatility rating.

8. The method of claim 1, further comprising:
deriving a reflectiveness value associated with each object within the environment;
discarding the one or more tracking points associated with an object when the derived reflectiveness value of the object is above a threshold; and
updating the determined priority rating for each of the one or more tracking points associated with the at least one object within the environment.

9. An electronic device comprising:
a communication interface;
at least one processor coupled to the communication interface; and
a memory coupled to the processor, the memory including instructions thereon that, when executed, cause the at least one processor to:
identify at least one object within an environment, from received image data,
assign a volatility rating to the identified object,
determine one or more tracking points associated with the identified object,
determine a priority rating for the each of the one or more tracking points associated with the identified object based on the assigned volatility rating of the identified object, and
select the one or more tracking points for optical tracking based on the priority rating.

10. The electronic device of claim 9, the memory further including instructions that cause the at least one processor to:
generate, the volatility rating for the identified object based on a tendency of the identified object to move within the environment.

11. The electronic device of claim 9, wherein identification of the at least one object, the memory further comprises instructions that cause the at least one processor to:
segment the environment to derive each object of the at least one object; and
identify each of the derived objects based on object recognition.

12. The electronic device of claim 9, the memory further including instructions that cause the at least one processor to:
detect and identify a second object within the environment;
assign a volatility rating to the second object;
determine one or more tracking points associated with the second object; and
determine a priority rating for each of the one or more tracking points associated with the second object based on the assigned volatility rating of the second object.

13. The electronic device of claim 9, the memory further including instructions that cause the at least one processor to:
detect an additional tracking point associated with the identified object; and
determine a priority rating for the additional tracking point based on the volatility rating for the respective identified object.

14. The electronic device of claim 9, the memory further including instructions that cause the at least one processor to:
determine whether at least one of the identified objects moved over a period of time;
responsive to determining the object moved, increase the assigned volatility rating for the object;
responsive to determining the object has not moved, decrease the assigned volatility rating for the respective identified object; and update the determined priority rating for each of the one or more tracking points associated with the object based on a change to the volatility rating.

15. The electronic device of claim 9, the memory further including instructions that cause the at least one processor to:
    discard each tracking point with a priority rating below a threshold; and
    determine a new tracking point associated with the at least one object with a low volatility rating.

16. The electronic device of claim 9, the memory further including instructions that cause the at least one processor to:
    derive a reflectiveness value associated with each object within the environment;
    discard the one or more tracking points associated with an object when the derived reflectiveness value of the object is above a threshold; and
    update the determined priority rating for each of the one or more tracking points associated with the at least one object within the environment.

17. A non-transitory computer readable medium comprising program code that, when executed by at least one processor, causes the at least one processor to:
    identify at least one object within an environment, from received image data;
    assign a volatility rating to the identified object;
    determine one or more tracking points associated with the identified object;
    determine a priority rating for the each of the one or more tracking points associated with the identified object based on the assigned volatility rating of the identified object; and
    select the one or more tracking points for optical tracking based on the priority rating.

18. The non-transitory computer readable medium of claim 17, further comprising program code that, when executed by at least one processor, causes the at least one processor to:
    generate, the volatility rating for the identified object based on a tendency of the identified object to move within the environment.

19. The non-transitory computer readable medium of claim 17, further comprising program code that, when executed by at least one processor, causes the at least one processor to:
    segment the environment to derive each object of the at least one object; and
    identify each of the derived objects based on object recognition.

20. The non-transitory computer readable medium of claim 17, further comprising program code that, when executed by at least one processor, causes the at least one processor to:
    detect and identify a second object within the environment;
    assign a volatility rating to the second object;
    determine one or more tracking points associated with the second object; and
    determine a priority rating for each of the one or more tracking points associated with the second object based on the assigned volatility rating of the second object.

21. The non-transitory computer readable medium of claim 17, further comprising program code that, when executed by at least one processor, causes the at least one processor to:
    determine whether at least one of the identified objects moved over a period of time;
    responsive to determining the object moved, increase the assigned volatility rating for the object;
    responsive to determining the object has not moved, decrease the assigned volatility rating for the respective identified object; and
    update the determined priority rating for each of the one or more tracking points associated with the object based on a change to the volatility rating.

22. The non-transitory computer readable medium of claim 17, further comprising program code that, when executed by at least one processor, causes the at least one processor to:
    discard each tracking point with a priority rating below a threshold; and
    determine a new tracking point associated with the at least one identified object with a low volatility rating.

23. The non-transitory computer readable medium of claim 17, further comprising program code that, when executed by at least one processor, causes the at least one processor to:
    derive a reflectiveness value associated with each object within the environment;
    discard the one or more tracking points associated with an object when the derived reflectiveness value of the object is above a threshold; and
    update the determined priority rating for each of the one or more tracking points associated with the at least one object within the environment.

* * * * *